United States Patent [19]

Coppola

[11] Patent Number: 4,611,289

[45] Date of Patent: Sep. 9, 1986

[54] COMPUTER POWER MANAGEMENT SYSTEM

[76] Inventor: Anthony F. Coppola, 31811 E. Nine Dr., Laguna Niguel, Calif. 92677

[21] Appl. No.: 537,333

[22] Filed: Sep. 29, 1983

[51] Int. Cl.⁴ .................... G06F 15/56; G06B 15/02
[52] U.S. Cl. .................................. 364/492; 364/200; 371/66
[58] Field of Search ............... 364/200, 900, 492, 493; 371/66

[56] References Cited

U.S. PATENT DOCUMENTS

| | | | |
|---|---|---|---|
| 4,080,659 | 3/1978 | Francini | 364/200 |
| 4,131,942 | 12/1978 | Gillett et al. | 364/200 |
| 4,203,153 | 5/1980 | Boyd | 364/200 |
| 4,307,455 | 12/1981 | Juhasz et al. | 364/900 |
| 4,365,290 | 12/1982 | Nelms et al. | 364/200 |

Primary Examiner—Felix D. Gruber
Attorney, Agent, or Firm—Reagin & King

[57] ABSTRACT

A power management system is disclosed for providing power to one or more computers having provisions for communication with an external data source. A source of backup power, including a bank of batteries, is provided which is provided to the power bus during a utility power interruption. A microprocessor monitors the utility line and the energy remaining in the batteries and provides data signals to the computer in response to utility power interruption and to predetermined battery energy levels. The data signals enable the computer to transfer data to non-volatile media to prevent data loss. In one embodiment, two way data links are provided between the computers and the microprocessor, which also controls power cutoff switches connected to each computer. Each computer may signal the microprocessor to cutoff backup power after data has been transferred to non-volatile media.

4 Claims, 3 Drawing Figures

COMPUTER POWER MANAGEMENT SYSTEM

BACKGROUND OF THE INVENTION

This invention relates to electrical power management systems and, more particularly, to power management systems for computers.

The widespread use of large-scale computers in critical applications which demand uninterrupted program execution has led to the development of uninterruptable power sources, commonly referred to as UPS. Generally, a UPS is in the form of a solid state inverter which converts a source of stored electrical energy into alternating current power having the same frequency and voltage as the power normally supplied to the computer from utility operated power mains. The stored energy source is generally a bank of batteries which is kept charged by charger circuits powered from the mains. In the event of an interruption of utility power, the UPS automatically provides power to the computer for a maximum duration determined by the capacity of the battery bank.

In order to ensure uninterrupted operation of computers for the maximum anticipated duration of power outage, very large and expensive UPS systems are employed in conjunction with large banks of batteries.

Recently, the widespread availability of microprocessors has resulted in a proliferation of low cost microcomputers as well as small and medium scale computers. These computers have found varied uses in business offices and manufacturing plants for such applications as word and data processing and data base management. In other applications, a microcomputer may be used as a remote input terminal to furnish data to a large scale computer. It will be appreciated that in this latter application, an interruption in power to the microcomputer can result in data loss to the large-scale computer even though that large-scale computer is protected against power interruptions. Further, routine power interruptions in a business office environment often result in unpredictable data loss in word processing and data management applications. Voltage transients and high frequency noise on the power lines can also cause loss of data or other erratic behavior in the computers.

From the above discussion, it may be seen that an uninterruptable power source for micro, small, and medium size computers is highly desirable. However, the large and expensive UPS systems developed for large scale computers are not economically feasible for use with smaller and lower cost computers. The physical distribution of multiple microcomputers throughout a large facility further complicates the task of providing uninterruptable power.

Accordingly, it is an object of the present invention to provide a new and improved computer power management system.

It is another object of the present invention to provide a new and improved computer power management system controlled by a microprocessor.

It is yet another object of the present invention to minimize the amount of uninterruptable power needed to operate one or more computers, by using a power management system which communicates with each computer being powered to provide power system status and command data via an input data port of the computer.

It is yet another object of the present invention to minimize the amount of uninterruptable power needed to operate one or more computers by using a power management system which communicates with the computer being powered both to provide power system status and command data and to receive computer system status and command data via an input/output data port of the computer.

SUMMARY OF THE INVENTION

The foregoing and other objects of the invention are accomplished by a power management system designed to provide power to a computer having the ability to communicate with an external data source. The system includes a source of backup power, such as a UPS in conjunction with a battery bank, for supplying power on a power bus to the computer when utility power is interrupted.

A microprocessor is connected to the computer as an external data source and is responsive to the state of the utility power for providing to the computer a first signal when the utility power is interrupted and a second signal when the utility power is restored. The first signal alerts the computer to take action to prevent loss of data. For example, the contents of the computer memory may be transferred to non-volatile media such as disk or tape. The second signal notifies the computer to return to normal program execution.

In one embodiment of the invention, the microprocessor is also responsive to the battery bank of the backup power source to determine the remaining energy which can be supplied by the power source during a utility power interruption. The first signal is provided to the computer after utility power is interrupted and the remaining energy has been depleted to a predetermined level previously stored in the microprocessor memory.

In another embodiment of the invention, a power cutoff switch is provided which is responsive to a power cutoff signal from the microprocessor for removing backup power from the computer during an interruption of utility power. The power cutoff signal is provided when a predetermined interval of time has elapsed, as measured from the occurrence of the first signal.

Other objects, features and advantages of the invention will become apparent by reference to the specification taken in conjunction with the drawings in which like elements are referred to by like reference designations throughout the several views.

DESCRIPTION OF THE PREFERRED EMBODIMENT

Figure 1:
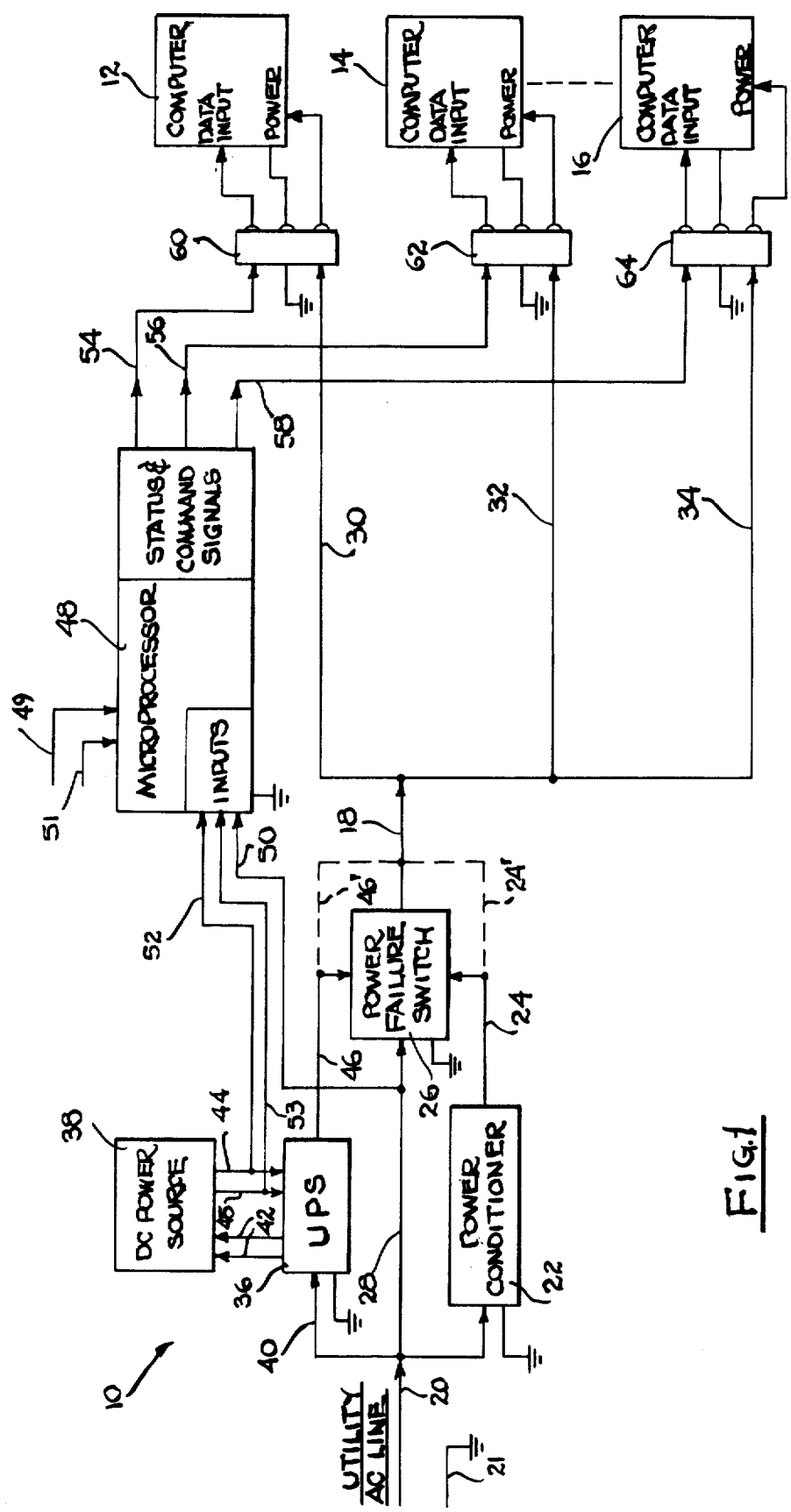
FIG. 1 is a block diagram of a computer power management system constructed in accordance with a first embodiment of the invention, showing the interconnections between the system and data and power input terminals of the computers.

Referring to FIG. 1, there is shown a block diagram of a computer power management system 10 constructed in accordance with a first embodiment of the invention. The system is designed to furnish operating power to one or more computers, designated as 12, 14 and 16 in FIG. 1, during periods of power interruption.

Under what is hereinafter referred to as normal conditions, power is supplied to a power distribution bus 18 from a utility AC power line 20, and its power return line 21 which carries power supplied by a local electrical utility company. The power on the line 20 is provided to an input terminal of a power conditioner 22. The power conditioner 22 contains circuitry well known to those skilled in the art for voltage regulation, filtering, and transient suppression of the incoming power, and provides the thus conditioned power on line 24 to an input terminal of a power failure switch 26.

The power failure switch 26 monitors the utility power which is provided to an input terminal of the switch 26 by line 28. As long as power is supplied on the line 20, the switch 26 provides the conditioned power on the line 24 to the bus 18. From the bus 18, power is distributed to the computers 12, 14 and 16 using, respectively, lines 30, 32, and 34.

Under what is hereinafter referred to as power failure conditions, power is supplied to the distribution bus 18 from a standby power source comprising an uninterruptable power supply (UPS) 36 powered from a source of stored power such as a bank of batteries 38. The UPS 36 includes battery charger circuits which, under normal conditions, receive utility power on line 40 and provide charging current on lines 42 to the batteries 38 to maintain them in a fully charged condition.

The UPS 36 also includes solid state inverter circuits which convert the DC power provided on lines 44, 45 from the batteries 38 to high voltage AC backup power which is provided to an input terminal of the switch 26 by line 46. The switch 26 is designed so that under power failure conditions, as sensed by lack of power on the line 28, the backup power on line 46 is provided to the bus 18 and thus, the computers 12, 14 and 16. The operation and construction of the UPS 36 and the switch 26 described thus far are well known to those skilled in the art. While the elements 22, 26, 36 and 38 are shown separately in FIG. 1 for purposes of description, it is envisioned that these elements may be combined into a single backup power unit.

The system 10 described thus far utilizes what is generally referred to as an off-line UPS configuration where the backup power on the line 46 is not applied to the bus 18 until power failure occurs. It is also intended that the embodiments of the present invention will be used in conjunction with an on-line UPS configuration where the backup power on the line 46 is combined with the conditioned power on the line 24, and this power combination is applied to the bus 18. Referring to FIG. 1, in the on-line UPS configuaration, the switch 26 is removed, and the lines 46 and 24 are connected directly to the bus 18, as shown by dotted lines 24' and 46'. Under normal conditions the on-line UPS provides a portion of the total power to the bus 18, while the remainder of the power is provided through conditioner 22 by the utility. Under these conditions, the UPS also derives its power from the utility using the line 40. Under power failure conditions, the UPS is the sole provider of power to the bus 18, and it uses the battery bank 38 as a source.

Also included in the system of FIG. 1 is a microprocessor 48 which, in the preferred embodiments of the invention, is part of a microcomputer which includes a video display and a keyboard for entering data. The processor 48, which may be powered on lines 49, 51 from the batteries 38 or other stored power source unaffected by utility power failure, is provided with an input signal on line 50 which indicates the status of utility power on the line 20 by, for example, detecting the voltage appearing on the line 28.

The processor 48 is also provided with an input signal on lines 52, 53 which may be used to calculate the power consumed from the batteries 38. One way to provide such a signal is to detect the amount of current flowing in line 44 from the batteries 38 to the UPS 36. Since, in general, battery voltage is relatively constant during discharge, current flow is generally proportional to battery consumption. The processor 48 provides output signals to a data input terminal, which may be in the form of an input channel or communications port, of the computers 12, 14, and 16 using, respectively, lines 54, 56 and 58.

The processor 48 is programmed to compute the amount of energy remaining in the batteries 38 under power failure conditions, in the following manner. Using the keyboard, data is initially entered into the processor memory which represent the voltage of the batteries 38, and the ampere-hour capacity of the battery bank 38 under fully charged conditions. The processor 48 is also provided with timekeeping functions such as a real-time clock and elapsed time counters, in a manner well known to those skilled in the art.

The processor 48 is programmed to multiply the fully charged ampere-hour battery capacity by battery voltage to derive charged battery energy capacity and to multiply the current flowing from the batteries 38, as provided on the lines 52, 53, by the battery voltage to derive battery power consumption. The processor 48 is further programmed to mathematically integrate the battery power consumption over time to derive battery energy consumption, and to subtract that energy consumption from the fully-charged energy capacity of the battery bank 38. In this manner, the processor continuously calculates the energy remaining in the battery bank 38 during battery discharge under power failure conditions.

The following example is presented to illustrate the installation and operation of the power management system 10 described above. It is envisioned that the system 10 would be installed in a facility having a plurality of computers distributed throughout the physical plant. Such a facility might be an office building or a manufacturing plant employing a variety of word and data processing computers, data-base management computers and general purpose personal computers. Typically, the power conditioner 22, UPS 36, battery bank 38, and power failure switch 26 all would be located in an unattended electrical utility room with connections to a power distribution unit having suitable junction boxes and connectors to interface with the bus 18 and the lines 30, 32 and 34 and power return lines. The microprocessor 48 and its associated display and keyboard would be located in a staffed building or plant maintenance office.

The computers to be powered by the system 10 are generally designed having power cords which plug into wall mounted power receptacles. These computers also have connectors which are used in conjunction with a variety of cables to connect to external data sources such as the processor 48. It is envisioned that special purpose connectors, designated 60, 62, 64 in FIG. 1, would be constructed which could be wall mounted in those areas of the facility designated for computers. These connectors 60, 62, and 64 would be used to connect both the data and power terminals of the computers 12, 14 and 16 to the system 10 using specially provided cables and plugs. This mechanization would provide a convenient way to add and remove loads from the system and would also ensure that no unnecessary loads are connected to the system 10.

The system 10 is designed to communicate with the computers 12, 14 and 16 under power failure conditions in a manner which both prevents the loss of data in the computers and minimizes the stored energy requirements of the battery bank 38. As is generally the case, each of the computers 12, 14 and 16 is presumed to be connected to a non-volatile data storage device such as a disk or tape drive. Under program control and in response to an external data input signal, these computers can transfer data from their internal memory banks to the non-volatile storage media for retention in the event of power loss.

Specific information concerning each computer connected to the system 10 is stored in the memory of the processor 48 using its keyboard. This information includes an indication of whether or not the computer is performing crictical tasks, the power consumption of the computer, and the time interval, hereinafter referred to as shutdown time, needed by that computer to transfer its memory contents to non-volatile storage media and to prepare for a power interruption. The processor 48 is programmed to multiply the computer power consumption by the shutdown time to arrive at the minimum energy, hereinafter referred to as the shutdown energy, required for each computer to enable it to withstand a power shutdown without data loss.

Under power failure conditions, the system 10 operates as follows. The power supplied to the computers 12, 14 and 16 from the bus 18 switches from conditioned utility power to backup power from the UPS 36 and battery bank 38. The microprocessor 48 senses the power failure and begins monitoring the stored energy remaining in the batteries 38. At the same time, the processor 48 provides a shutdown data signal, using the lines 54, 56 and 58, to those computers designated as not performing critical tasks. This data signal is designed to instruct these computers to perform an orderly shutdown procedure. Such a procedure might include instructions to cease program execution, turn off peripheral devices, transfer data from internal memory to a non-volatile media, and prepare for power interruption. For those computers performing critical tasks, the shutdown data signal is provided only when the energy remaining in the battery bank 38 approaches the sum of the shutdown energies of the computers powered by the system 10.

By causing the non-critical task computers to cease program execution and store data upon power failure conditions, the power consumed by these computers is reduced, thus conserving battery power for use in powering the computers performing critical tasks. The shutdown of the critical task computers is delayed until the batteries 38 are depleted to the point where shutdown is absolutely necessary to preserve data. Since a majority of utility power failures are of sufficiently short duration to avoid battery depletion, the above described mechanization permits these computers to ride through short interruptions and reduces the likelihood of critical program interruption. When the utility power is restored, the processor 48 provides a data signal on the lines 54, 56 and 58 to cause the computers 12, 14 and 16 to return to normal program execution.

Figure 2:
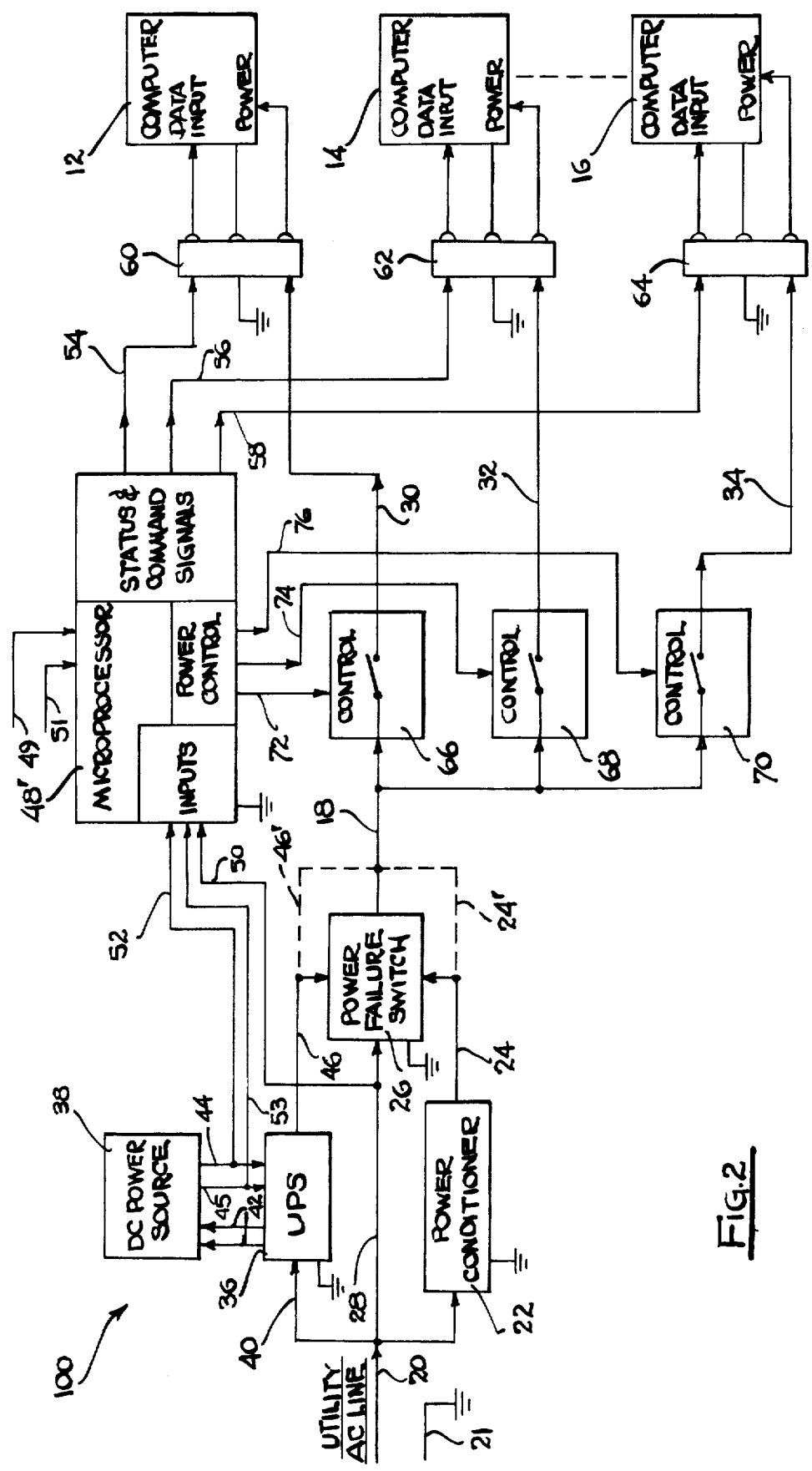
FIG. 2 is a block diagram of a computer power management system constructed in accordance with a second embodiment of the invention, showing the feature of microprocessor-controlled power cutoff switches for individual computers.

FIG. 2 is a block diagram of a power management system 100 constructed in accordance with a second embodiment of the invention. The system 100 differs from the system 10 by the addition of power cutoff switches 66, 68 and 70. As shown in FIG. 2, these switches are connected, respectively, between the bus 18 and the individual lines 30, 32 and 34 which provide power to the computers 12, 14, and 16. The switches 66, 68 and 70 are designed to cutoff backup power to the respective computers 12, 14 and 16 in response to control signals provided on lines 72, 74 and 76, respectively, from a microprocessor 48'. The microprocessor 48' includes all of the features of the processor 48 of the system 10 as well as the additional functions described below.

The operation of the system 100 is as follows. Under normal conditions, utility furnished power appears on the bus 18 and is routed through the normally closed switches 66, 68 and 70 to the computers 12, 14 and 16. Under power failure conditions, only backup power appears on the bus 18, and the microprocessor 48' signals the non-critical task computers in the same manner as the processor 48 to transfer data to non-volatile media and prepare for power interruption. However, the processor 48' is also programmed to activate the appropriate switches 66, 68 and 70 associated with each non-critical task computer to cutotf power to that computer after its shutdown time has elapsed. As the reader will recall, the shutdown times for each computer are stored in the processor. Hence, the processor 48' is capable of disconnecting the backup power to the non-critical task computers after they have prepared for shutdown, thus greatly decreasing the energy consumed from the batteries 38 under power failure conditions.

Using the keyboard, the processor 48' can also be provided with a priority data list for all of the critical task computers which indicates in what order and at what level of remaining battery energy each is to be shutdown. In this manner, the critical task computers need not all be shutdown at the same time. For example, at the point where the batteries 38 are only partially depleted, certain of the critical task computers may be signalled to shutdown, followed by the cutoff of power to these computers after their shutdown times have elapsed. In this way, the remaining critical task computers are enabled to continue execution for far longer periods of time than were possible using prior art uninterruptable power systems. When utility power is restored, the processor 48' causes the switches 66, 68 and 70 to reclose, and signals the computers 12, 14 and 16 to resume program execution.

Figure 3:
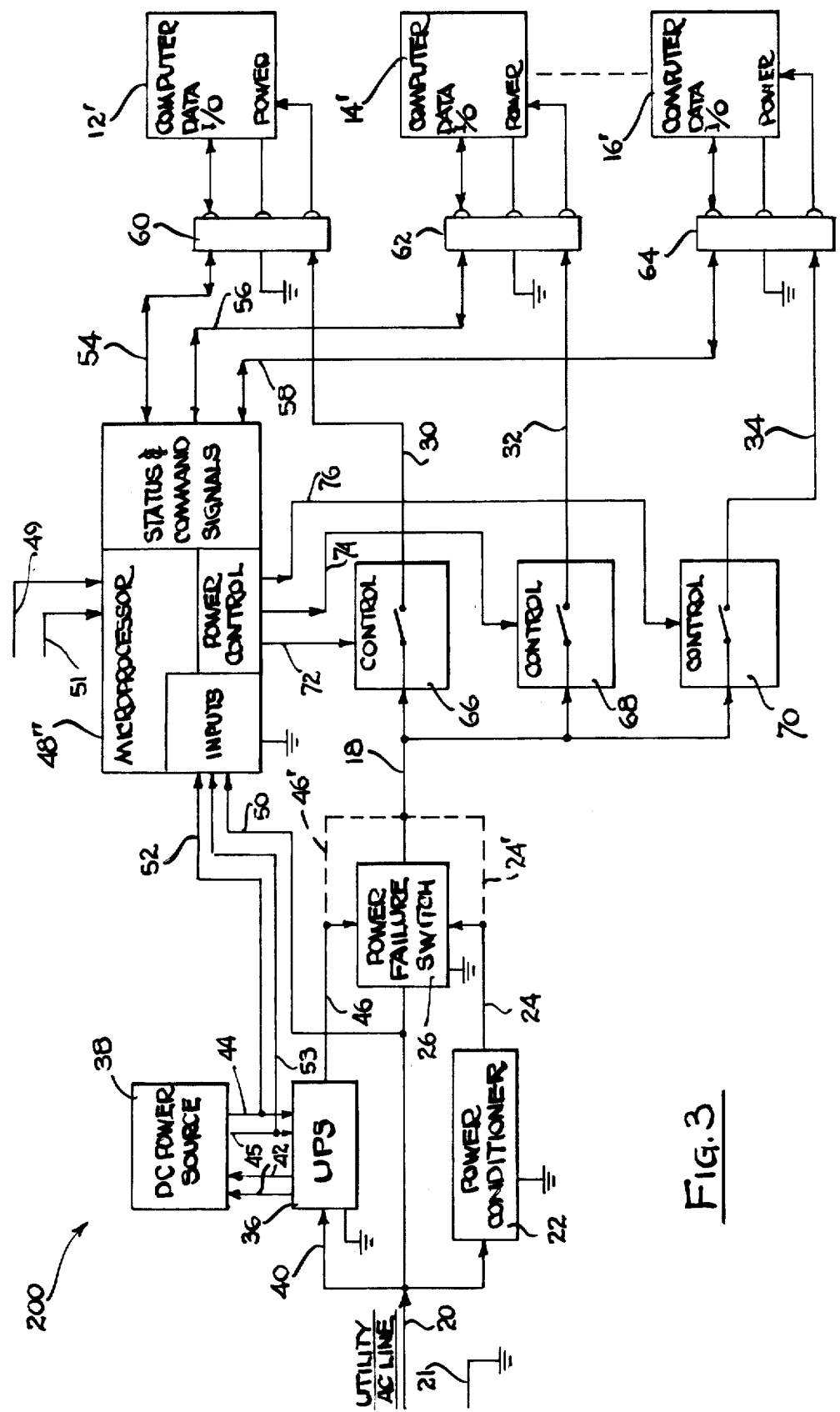
FIG. 3 is a block diagram of a computer power management system constructed in accordance with a third embodiment of the invention, showing the feature of a bidirectional data link between the system and the computers.

FIG. 3 is a block diagram of a power management system 200 constructed in accordance with a third embodiment ot the invention. The system 200 is similar in operation to the system 100 except that the data link between the computers 12', 14' and 16', and the processor 48" is bidirectional. In other words, the computers and the processor may send and receive data from each other. This is accomplished by connecting each of the data lines 54, 56, and 58 to a data input/output terminal or communications port of the respective computer 12', 14' and 16', and providing the processor 48" with a bidirectional data interface.

The operation of the system 200 is similar to the operation of the system 100 with the following exceptions. The data relating to the characteristics of the computers 12', 14' and 16', such as power consumption, shutdown energy and shutdown time, is normally provided to the processors 48 and 48' using a keyboard to enter the data. However, in the system 200, this information can be provided to the processor 48" directly from each computer 12', 14' and 16' using the bioirectional data interface. Accordingly, as each new computer is plugged into the system, it can address the processor 48" and provide to it the necessary power system data.

Further, each computer 12', 14' and 16' can directly notify the processor 48" of its status as a critical or non-critical task computer. In fact, the status of each computer can vary depending on the task being performed at any give time. Thus, each computer can perform critical and non-critical tasks and can automatically update the processor 48" with its latest status. The status information can also be coded to indicate the priority level of the task being performed. In this way, the processor 48" can automatically compile the priority list for power shutdown of the various computers.

Although the processor 48" may be provided with a shutdown time for each computer, in the system 200 each computer is capable of alerting the processor 48" that it has in fact completed the shutdown task prior to the shutdown time. For example, if the computer was not executing a program and already had all of its data stored on non-volatile media when a power failure occurred, this information could be communicated to the processor 48", thus enabling immediate power cutoff to that computer when the power failure occurred. In this manner 48" can automatically reallocate the priorities of the remaining computers.

While there have been shown and described several preferred embodiments of the invention, it is to be understood that various other adaptations and modifications may be made within the spirit and scope of the invention. For example, it is envisioned that the processor 48" may be equipped with non-volatile storage capability such as a magnetic disk. In the system 200, this feature would enable a computer 12', 14', 16' to use the processor 48" disk to store critical data in the event the computer's disk is not functioning properly, thus providing critical data backup storage. It is also envisioned that, in the event the utility power experiences an undervoltage condition, commonly known as a brownout, this event could be detected by the processor 48 on the line 50. By connecting an additional output terminal of the processor 48 to an appropriate input terminal of the UPS 36, the UPS 36 can be made to provide the additional voltage to bring the power on the bus 18 up to a proper level.

It is thus intended that the invention be limited in scope only by the appended claims.

What is claimed is:

1. A power management system for providing power to a computer having provision for communication with an external data source, comprising:
   a source of backup power;
   means for providing utility power to the computer on a power bus;
   means for providing the backup power source to the power bus when the utility power is interrupted;
   processor means connected to the computer as an external data source and responsive to the state of the utility power for providing to the computer a first signal after the utility power is interrupted and a second signal after the utility power is restored, whereby the computer may respond to the first signal to prevent loss of data and to the second signal to restore normal operation; and
   switch means responsive to a power cutoff signal from the processor means for removing backup power from the computer during an interruption of utility power; and in which the processor means includes means for receiving data from the computer and means for providing the power cutoff signal in response to a safety signal generated by the computer when data loss has been prevented by the computer.

2. A power management system for providing power to a computer having provision for communication with an external data source, comprising:
   a source of backup power;
   means for providing utility power to the computer on a power bus;
   means for providing the backup power source to the power bus when the utility power is interrupted;
   processor means connected to the computer as an external data source and responsive to the state of the utility power for providing to the computer a first signal after the utility power is interrupted and a second signal after the utility power is restored, whereby the computer may respond to the first signal to prevent loss of data and to the second signal to restore normal operation; and
   in which the processor means is further responsive to the backup power source for determining the remaining energy which can be supplied by the source during a utility power interruption and further includes means for storing a value representing a predetermined level of electrical energy, and means for comparing the remaining energy from the backup power source to the predetermined level, and in which the first signal is provided after the utility power is interrupted and the remaining energy is less than or equal to the predetermined level of energy.

3. The system of claim 2 in which the processor means includes means for receiving data from the computer and in which the value of the predetermined level of electrical energy is provided to the processor means by the computer.

4. A power management system for providing power to a computer having provision for communication with an external data source, comprising:
   a source of backup power;
   means for providing utility power to the computer on a power bus;
   means for providing the backup power source to the power bus when the utility power is interrupted;
   processor means connected to the computer as an external data source and responsive to the state of the utility power for providing to the computer a first signal after the utility power is interrupted and a second signal after the utility power is restored, whereby the computer may response to the first signal to prevent loss of data and to the second signal to restore normal operation;

switch means responsive to a power cutoff signal from the processor means for removing backup power from the computer during an interruption of utility power; and in which the processor means includes means for storing a predetermined interval of time, means for providing the power cutoff signal when the predetermined interval of time has elapsed, as measured form the occurrence of the first signal, and means for receiving data from the computer whereby the predetermined interval of time is provided to the processor means by the computer.

* * * * *